(12) United States Patent
Yoshiyama

(10) Patent No.: US 11,466,157 B2
(45) Date of Patent: Oct. 11, 2022

(54) CURING CATALYST FOR ORGANIC POLYMER OR ORGANOPOLYSILOXANE, MOISTURECURABLE COMPOSITION, CURED PRODUCT, AND PRODUCTION METHOD THEREFOR

(71) Applicant: NITTO KASEI CO., LTD., Osaka (JP)

(72) Inventor: Haruka Yoshiyama, Osaka (JP)

(73) Assignee: Nitto Kasei Co., Ltd., Osaka (JP)

( * ) Notice: Subject to any disclaimer, the term of this patent is extended or adjusted under 35 U.S.C. 154(b) by 413 days.

(21) Appl. No.: 16/758,730

(22) PCT Filed: Nov. 8, 2018

(86) PCT No.: PCT/JP2018/041446
§ 371 (c)(1),
(2) Date: Apr. 23, 2020

(87) PCT Pub. No.: WO2019/098112
PCT Pub. Date: May 23, 2019

(65) Prior Publication Data
US 2020/0362173 A1   Nov. 19, 2020

(30) Foreign Application Priority Data
Nov. 14, 2017   (JP) .............................. JP2017-219482

(51) Int. Cl.
| C08L 83/04 | (2006.01) |
| B01J 31/28 | (2006.01) |
| C08L 101/10 | (2006.01) |
| B01J 31/02 | (2006.01) |
| B01J 31/38 | (2006.01) |
| C08K 5/098 | (2006.01) |
| C08K 5/17 | (2006.01) |

(52) U.S. Cl.
CPC ......... *C08L 101/10* (2013.01); *B01J 31/0237* (2013.01); *B01J 31/38* (2013.01); *C08K 5/098* (2013.01); *C08K 5/17* (2013.01); *C08L 83/04* (2013.01); *B01J 31/0211* (2013.01); *B01J 2531/46* (2013.01); *B01J 2540/40* (2013.01)

(58) Field of Classification Search
CPC ..... C08L 83/04; C08L 101/10; B01J 31/0211; B01J 31/0237; B01J 31/38; B01J 2531/46; B01J 2540/40
See application file for complete search history.

(56) References Cited

U.S. PATENT DOCUMENTS

| 4,395,526 A | 7/1983 | White et al. |
| 4,438,039 A | 3/1984 | Beers et al. |
| 4,525,565 A * | 6/1985 | Laisney ............... C08K 5/0091 |
| | | 528/901 |
| 4,546,017 A | 10/1985 | Flackett et al. |
| 4,722,967 A | 2/1988 | Beers et al. |
| 6,258,878 B1 * | 7/2001 | Bahadur .............. C08K 5/0025 |
| | | 524/356 |
| 7,115,695 B2 * | 10/2006 | Okamoto ............. C08K 5/0025 |
| | | 528/21 |
| 2007/0299214 A1 | 12/2007 | Wakabayashi et al. |
| 2010/0285312 A1 | 11/2010 | Mizuno et al. |
| 2011/0124802 A1 | 5/2011 | Maliverney et al. |
| 2011/0178220 A1 | 7/2011 | Davio et al. |
| 2013/0096257 A1 | 4/2013 | Yamamoto et al. |

FOREIGN PATENT DOCUMENTS

| CN | 101056945 A | 10/2007 | |
| CN | 101861359 A | 10/2010 | |
| CN | 101903448 A | 12/2010 | |
| CN | 101939366 A | 1/2011 | |
| CN | 103045080 A | 4/2013 | |
| CN | 103102576 A * | 5/2013 | ............... C08F 4/76 |
| JP | 54-90396 A * | 7/1979 | ............ C08G 63/22 |
| JP | 59-84948 A | 5/1984 | |
| JP | 60161457 A | 8/1985 | |
| JP | 6342942 B2 | 8/1988 | |
| JP | 8-41358 A | 2/1996 | |
| JP | 2003-147220 A * | 5/2003 | ............ C08L 101/10 |
| JP | 2008-50448 A * | 3/2008 | ............ C08L 101/10 |
| JP | 2013032450 A | 2/2013 | |
| JP | 2014-070079 A | 4/2014 | |
| WO | WO 2012/175725 A1 * | 12/2012 | .............. B01J 31/24 |

OTHER PUBLICATIONS

JP 2003-147220 A (May 21, 2003), Nakamura et al.; machine translation. (Year: 2003).*
CN 103102576 A (May 15, 2013), Su et al.; machine translation. (Year: 2013).*
JP 2008-050448 A (Mar. 6, 2008), Noda, K.; machine translation. (Year: 2008).*
International Search Report dated Feb. 12, 2019, issued in corresponding International Application No. PCT/JP2018/041446, filed Nov. 8, 2018, 1 page.

(Continued)

*Primary Examiner* — Rip A Lee
(74) *Attorney, Agent, or Firm* — Christensen O'Connor Johnson Kindness PLLC

(57) ABSTRACT

The present invention provides a curing catalyst for an organic polymer or an organopolysiloxane, which has a high safety and a practical curing speed, and improves the adhesion of a cured product to a substrate, and can be produced at low cost.

An aspect of the present invention provides a curing catalyst [B] for an organic polymer or an organopolysiloxane, which is used for curing an organic polymer [A1] or an organopolysiloxane [A2] having a reactive hydrolyzable silicon-containing group, wherein the catalyst [B] contains a titanium compound [B1] represented by the following formula and a secondary amine compound or a tertiary amine compound [B2].

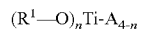

(In the formula, $R^1$ is a hydrocarbon group having 1 to 10 carbon atoms, and A is a carboxylic acid residue, and n is 1 or 2.)

7 Claims, No Drawings

(56) References Cited

OTHER PUBLICATIONS

Extended European Search Report dated Jan. 19, 2021, issued in corresponding European Application No. 18879105.7, filed Nov. 8, 2018, 8 pages.
Office Action dated Aug. 24, 2021, issued in corresponding CN Application No. 201880073501.9, 19 pages.

* cited by examiner

CURING CATALYST FOR ORGANIC POLYMER OR ORGANOPOLYSILOXANE, MOISTURECURABLE COMPOSITION, CURED PRODUCT, AND PRODUCTION METHOD THEREFOR

TECHNICAL FIELD

The present invention relates to a curing catalyst used for an organic polymer or an organopolysiloxane, a moisture-curable composition, a cured product and a production method therefore.

BACKGROUND ART

One-pack type moisture-curable rubber compositions generally have a high curing rate and do not require weighing and mixing of various additives such as a base polymer, a cross-linking agent and a catalyst before use, and therefore is superior in workability as compared with the two-part type.

As these one-pack type moisture-curable rubber compositions, silicone-based rubber, modified silicone-based rubber, urethane-based rubber, polysulfide-based rubber and the like are known.

Organopolysiloxane compositions are widely used as the one-pack type moisture-curable rubber composition of the silicone-based rubber, and cure at room temperature to form a rubber elastic body. Siloxane polymer compounds having a main chain of —Si—O— bonds obtained by crosslinking and polymerizing organosiloxanes are widely used in the fields of construction, civil engineering, electricity, electronics, automobile, etc. because of their excellent properties such as water repellency, heat resistance, weather resistance, cold resistance, and electrical insulation.

As the one-pack type moisture-curable rubber composition of modified silicone-based rubber, there is a composition containing a polymer having a polyether as a main chain and having a crosslinkable reactive hydrolyzable silicon functional group. The curable composition of this polymer has better storage stability, weather resistance, foaming resistance and discoloration resistance than those of the urethane-based rubber, and has better curability than that of the polysulfide-based rubber, and has little pollution to the surroundings and no toxicity.

It is considered that the reaction mechanism of the process in which the silicone-based rubber and the modified silicone-based rubber become a cured product is based on a condensation reaction or an addition reaction of a reactive hydrolyzable silicon-containing group in the presence of water, and the polymerization proceeds to form a cured polymer having a three-dimensional network structure. A curing catalyst is used to accelerate the curing process in this reaction (Patent Literature 1 to 4).

CITATION LIST

Patent Literature

Patent Literature 1: JP1996-41358
Patent Literature 2: JP1985-161457
Patent Literature 3: JP1988-42942
Patent Literature 4: JP2003-147220

SUMMARY OF INVENTION

Technical Problem

As a curing catalyst for the cured composition of the silicone-based rubber and modified silicone-based rubber having the reactive hydrolyzable silicon-containing group, tin carboxylate compounds, alkyltin salt compounds and the like have been used, but there are concerns about their effects on living organisms as endocrine disruptors. Therefore as a moisture-curable composition which does not use such substances, a combined catalyst of a carboxylic acid and an amine (Patent Literature 1) has been proposed. However, there is a problem that a sufficient curing speed cannot be obtained during operation.

In Patent Literature 2 and 3, the use of a titanium acid ester compound such as diisopropoxy titanium bis (alkyl acetoacetonate) as a catalyst has been proposed. However there is a problem that the compound is easily decomposed by moisture contained in additives and fillers in the composition, and the curing speed varies due to humidity during operation, so that a stable cured product cannot be obtained.

In Patent Literature 4, the use of a titanium tetracarboxylate compound as a catalyst has been proposed. In this case, however, a practical curing speed was not obtained, and the adhesion of the cured product cured using the catalyst to the substrate was insufficient, and thus it was difficult to use the cured product on site.

Therefore, it has been desired to develop a curing catalyst having a high safety (low toxicity and low environmental pollution), having a practical curing speed, and improving the adhesion of the cured product to a substrate.

In view of the above-mentioned prior art, an object of the present invention is to provide a curing catalyst for an organic polymer or an organopolysiloxane, which has a high safety and a practical curing speed, and improves the adhesion of a cured product to a substrate, and can be produced at low cost. Another object of the present invention is to provide a moisture-curable composition containing the catalyst.

Solution to Problem

An aspect of the present invention provides a curing catalyst [B] for an organic polymer or an organopolysiloxane, which is used for curing an organic polymer [A1] or an organopolysiloxane [A2] having a reactive hydrolyzable silicon-containing group, wherein the catalyst [B] contains a titanium compound [B1] represented by the following formula and a secondary amine compound or a tertiary amine compound [B2].

$$(R^1-O)_n Ti-A_{4-n}$$

(In the formula, $R^1$ is a hydrocarbon group having 1 to 10 carbon atoms, and A is a carboxylic acid residue, and n is 1 or 2.)

As a result of intensive investigation by the present inventors, it has been found that when a combined catalyst of a dicarboxylic acid titanium dialkoxide or a tricarboxylic acid titanium alkoxide and a secondary or tertiary amine compound was used, the curing rate and the adhesion of the organic polymer or the organopolysiloxane were significantly increased, and the present invention has been completed.

DESCRIPTION OF EMBODIMENTS

Hereinafter, the present invention will be explained in detail.

A curing catalyst [B] for an organic polymer or an organopolysiloxane of the present invention is used for curing an organic polymer [A1] or an organopolysiloxane [A2] having a reactive hydrolyzable silicon-containing group (Hereinafter, collectively referred to as "polymer [A]"). The polymer [A] is preferably a liquid at room temperature.

The polymer [A] has at least one reactive hydrolyzable silicon-containing group per molecule at a molecular terminal or a side chain. The reactive hydrolyzable silicon-containing group may be present at the terminal of the polymer [A] molecule, may be present in the side chain, and may be present at both the terminal and the side chain. The number of reactive hydrolyzable silicon-containing groups may be at least one per molecule of the polymer [A], but from the viewpoint of the curing speed and the physical properties of the cured product, it is preferable that the number is 1.5 or more per molecule on average. A known method can be adopted as a method of bonding the reactive hydrolyzable silicon-containing group to the main chain of the polymer.

The reactive hydrolyzable silicon-containing group is a group having a silicon atom bonded to a reactive group consisting of a hydrolyzable group (e.g. halogen, alkoxy, alkenyloxy, acyloxy, amino, aminooxy, oxime, amide) or a hydroxyl group, and has a property of causing a condensation reaction by using a catalyst or the like as necessary in the presence of moisture or a crosslinking agent. Specifically, examples of the reactive hydrolyzable silicon-containing group include a halogenated silyl group, an alkoxysilyl group, an alkenyloxysilyl group, an acyloxysilyl group, an aminosilyl group, an aminooxysilyl group, an oximesilyl group, and an amidesilyl group and the like.

The number of reactive hydrolyzable groups bonded to one silicon atom is selected from the range of 1 to 3. In addition, the number of reactive hydrolyzable groups bonded to one silicon atom may be one or more kinds. Further, a reactive hydrolyzable group and a non-reactive hydrolyzable group may be bonded to one silicon atom, or a hydrolyzable group and a hydroxyl group may be bonded to one silicon atom. As the reactive hydrolyzable silicon-containing group, the alkoxysilyl group (including a monoalkoxysilyl group, a dialkoxysilyl group, and a trialkoxysilyl group) is particularly preferable in terms of easy handling.

Among the above-mentioned alkoxysilyl groups, trialkoxysilyl groups are preferred because they have high activity and good curability can be obtained, and the resulting cured product has excellent resilience, durability and creep resistance. On the other hand, dialkoxysilyl groups and monoalkoxysilyl groups are preferable because they have excellent storage stability and the resulting cured product has high elongation and high strength.

By using the polymer [A] in which the reactive hydrolyzable silicon-containing group is a dialkoxysilyl group in combination with the polymer [A] in which the reactive hydrolyzable silicon-containing group is a trialkoxysilyl group, it is also possible to balance the physical properties and curability of the cured product (Organic Polymer [A1])

The main chain of the organic polymer [A1] used in the present invention includes one having a carbon atom, for example, an alkylene oxide polymer, a polyester polymer, an ether/ester block copolymer, a polymer of ethylenically unsaturated compound, a polymer of diene-based compound and the like.

Examples of the alkylene oxide polymer include those having one or more kinds of repeating units such as

[CH$_2$CH$_2$O]$_n$
[CH(CH$_3$)CH$_2$O]$_n$
[CH(C$_2$H$_5$)CH$_2$O]$_n$
[CH$_2$CH$_2$CH$_2$CH$_2$O]$_n$.

Here, n is the same or different and is an integer of 2 or more. These alkylene oxide polymers may be used alone or in combination of two or more kinds. Further, a copolymer containing two or more kinds of the above repeating units may also be used.

Examples of the polyester polymer include those having a carboxylic acid such as acetic acid, propionic acid, maleic acid, phthalic acid, citric acid, pyruvic acid, lactic acid, and an anhydride thereof, an intramolecular and/or intermolecular ester thereof and a substituted product thereof as a repeating unit.

Examples of the ether/ester block copolymer include those having both a repeating unit used in the above-described alkylene oxide polymer and a repeating unit used in the above-described polyester polymer as a repeating unit.

Further, Examples of the polymer of the ethylenically unsaturated compound and the diene-based compound include a homopolymer such as ethylene, propylene, acrylate, methacrylate, vinyl acetate, acrylonitrile, styrene, isobutylene, butadiene, isoprene, and chloroprene, and a copolymer of two or more of these compounds. More specifically, polybutadiene, styrene-butadiene copolymer, acrylonitrile-butadiene copolymer, ethylene-butadiene copolymer, ethylene-propylene copolymer, ethylene-vinyl acetate copolymer, ethylene-(meth) acrylate copolymer, polyisoprene, styrene-isoprene copolymer, isobutylene-isoprene copolymer, polychloroprene, styrene-chloroprene copolymer, acrylonitrile-chloroprene copolymer, polyisobutylene, polyacrylate, polymethacrylate and the like can be mentioned. These polymers may be used alone or in combination of two or more kinds.

As the organic polymer [A1], an organic polymer having a polar group such as a nitrogen-containing characteristic group in the molecule may also be used. Specific examples of the nitrogen-containing characteristic group include those represented by a (thio) urethane group, an allophanate group, a bonding group derived from a (thio) urethane group such as other N-substituted urethane groups and an N-substituted allophanate group, a (thio) urea group, a biuret group, other N-substituted urea groups, an N,N'-substituted urea group, a bonding group derived from a (thio) urea group such as an N-substituted biuret group and an N,N'-substituted biuret group, an amide group, a bonging group derived from an amide group such as an N-substituted amide group, a bonding group derived from an imino group, a (thio) ester group, a (thio) ether group and the like, but are not limited thereto. Among these groups, the nitrogen-containing characteristic group is preferable in terms of high curability, and the bonding group derived from a (thio) urethane group and the bonding group derived from a (thio) urea group are more preferable in terms of ease of synthesis. Further, only one nitrogen-containing characteristic group may be contained in the organic polymer [A1], and one or more kinds of a plurality of nitrogen-containing characteristic groups may be contained in the organic polymer [A1]. Here, the terms of "(thio)" and "N-substituted" are the same as above.

When the organic polymer [A1] contains a polar group such as the nitrogen-containing characteristic group, the toughness of the cured product is improved, and the curability and adhesive strength are increased. In particular, when the cross-linkable silicon group is linked to the main chain via a polar group such as the nitrogen-containing characteristic group, the curability is further improved. The reason for this is that the polar groups of the nitrogen-containing characteristic groups strongly attract each other due to an interaction such as a hydrogen bond. It is considered that when the polar groups of the nitrogen-containing characteristic groups strongly attract each other, the molecules of the curable resin also strongly bind to each other (form a domain), thereby exhibiting toughness in the cured product. Further, when the cross-linkable silicon group is linked to the main chain via a polar group such as the nitrogen-containing characteristic group, the cross-linkable silicon groups are also close to each other while the nitrogen-containing characteristic groups form a domain with each other. Thereby, the contact probability between the cross-linkable silicon groups is also improved, and further, the condensation reactivity between the cross-linkable silicon groups is improved by the catalytic curing by the polar group in the nitrogen-containing characteristic group.

Such an organic polymer [A1] (modified silicone-based polymer) may be produced by a known method such as the method described in JPB198618569, or is commercially available. Commercially available products include, for example, Kaneka MS polymer series (dimethoxymethylsilyl group-containing polymers such as MS polymer S-203, MS polymer S-303, MS polymer S-227, MS polymer S-327, MS polymer SAX-220, MS polymer SAX-260, MS polymer SAX-350, MS polymer SAX-400, etc.; trimethoxysilyl group-containing polymers such as MS polymer SAX-510, MS polymer SAX-520, MS polymer SAX-530, MS polymer SAX-580, MS polymer SAX-590; MS polymer S-903, MS polymer S-911 etc), Silyl series (Silyl polymer SAT-200, Silyl polymer MA430, Cyril polymer MAX447, etc.), MA series, SA series, OR series available from Kaneka Corporation; ES series (ES-GX3440ST etc.), ESGX series etc. available from AGC Corporation.

The number average molecular weight of the organic polymer [A1] used in the present invention is not particularly limited. However, An excessively high molecular weight compound has a high viscosity, and when used as a curable composition, it becomes difficult to use the composition. Thus the number average molecular weight of the organic polymer [A1] is desirably 30,000 or less. Such an organic polymer may be produced by a known method, and a commercially available product such as the above-described Kaneka MS polymer available from Kaneka Corporation may be used.

(Organopolysiloxane [A2])

The organopolysiloxane [A2] used in the present invention has a main chain composed of a siloxane bond represented by Si—O, and further has an organic group bonded to a silicon atom constituting the siloxane bond. Specific examples of such organic groups include alkyl groups such as methyl, ethyl, propyl, and butyl; cycloalkyl groups such as cyclohexyl; alkenyl groups such as vinyl, allyl, isopropenyl and crotyl; aryl groups such as phenyl, toluyl, and xylyl; aralkyl groups such as benzyl and phenylethyl; and groups in which all or part of the hydrogen atoms of these organic groups have been substituted with halogen atoms, such as a chloromethyl group and a 3,3,3-trifluoropropyl group.

Examples of the organopolysiloxane [A2] include those having a repeating unit represented by the following formula.

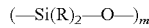

(In the formula, R represents the same or different organic groups, and m represents an integer of 2 or more.)

Specific examples include those having one or more kinds of repeating units such as

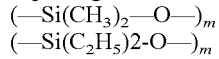

(—Si(Ph)$_2$—O—)$_m$
(—Si(—CH=CH$_2$)$_2$—O—)$_{m'}$

Here, m is the same or different and is an integer of 2 or more. The organopolysiloxane [A2] may be composed of a single main chain, or may be composed of two or more main chains.

The organopolysiloxane may be linear, and may be branched including trifunctional(R'SiO$_{1.5}$) or tetrafunctional (SiO$_2$). Further, depending on the physical properties and application of the cured product, a bifunctional form (R'$_2$SiO) or a monofunctional form (R'$_3$SiO$_{0.5}$) may be combined as necessary (where R' is an organic group). Further, the hydrolyzable silicon-containing group may be bonded to any of the molecular terminals and the middle of the molecular chain.

The organopolysiloxane is generally represented by an average composition formula of R$_a$SiO$_{4-a/2}$ (e.g., JPA2005194399 and JPA1996151521). The above notation followed this.

The viscosity of the organopolysiloxane [A2] used in the present invention is not particularly limited, but if the viscosity is excessively high, the workability may be reduced or the physical properties of the resulting cured product may be impaired. Thus the viscosity at 25° C. is desirably in the range of 0.025 to 100 Pa·s. Such an organopolysiloxane may be produced by a known method, and commercial products such as Tosseal series available from GE Toshiba Silicone Co., Ltd., Sealant series available from Shin-Etsu Chemical Co., Ltd., and SH series available from Toray Dow Corning Co., Ltd. may be used.

(Curing Catalyst [B])

The curing catalyst [B] contains a titanium compound [B1] and a secondary amine compound or a tertiary amine compound [B2].

<Titanium Compound [B1]>

The titanium compound [B1] is represented by the following formula.

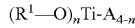

(In the formula, R$^1$ is a hydrocarbon group having 1 to 10 carbon atoms, and A is a carboxylic acid residue, and n is 1 or 2.)

Examples of the hydrocarbon group having 1 to 10 carbon atoms represented by R' include linear or branched alkyl groups such as methyl, ethyl, propyl, isopropyl, butyl, isobutyl, sec-butyl, tert-butyl, pentyl, hexyl, heptyl, 1-ethylpentyl, octyl, nonyl, 1,1-dimethylheptyl, decyl, etc.

The number of carbon atoms of the carboxylic acid residue represented by A is 2 to 18, preferably 4 to 10, and more preferably 8 to 10. Examples of the organic acid include acetic acid, trichloroacetic acid, trifluoroacetic acid, pivalic acid, neohexanoic acid, octylic acid, 2-ethylhexanoic acid, neononanoic acid, neodecanoic acid, 1-adamantanecarboxylic acid, and stearic acid and the like. Among these organic acids, octyl acid, 2-ethylhexanoic acid, neononanoic acid and neodecanoic acid are preferred from the viewpoint of the stability and handleability of the compound, and neodecanoic acid is more preferred from the viewpoint of catalytic activity.

The above-mentioned titanium compound [B1] may be used alone or in combination of two or more kinds.

<Secondary Amine Compound Or Tertiary Amine Compound [B2]>

The secondary amine compound or the tertiary amine compound of the present invention may include a primary amine moiety in the structure, and examples thereof include dioctylamine, pyrrolidine, piperidine, 2-methylpiperidine, 4-methylpiperidine, hexamethyleneimine, trioctylamine, N-methylpiperidine, DBU, N,N-dimethylpropanediamine, N,N-dibutylpropanediamine, N-methylpiperazine, 2-aminopiperidine, 3,3'-diaminodipropylamine, 1,1,3,3-tetramethylguanidine and the like. Among these compounds, pyrrolidine, piperidine, 2-methylpiperidine, 4-methylpiperidine, hexamethyleneimine, N,N-dimethylpropanediamine, N,N-dibutylpropanediamine, N-methylpiperazine are preferred, and 4-methylpiperidine and N,N-dimethylpropanediamine are more preferred.

The above-mentioned secondary amine compound or tertiary amine compound may form a salt with the above-mentioned organic acid.

The above-mentioned secondary amine compound or tertiary amine compound [B2] may be used alone or in combination of two or more kinds.

<Other Curing Catalyst>

In addition to the titanium compound [B1] and the secondary or tertiary amine compound [B2], an organic acid or an organic acid metal salt may be further used.

Examples of the organic acid include acetic acid, trichloroacetic acid, trifluoroacetic acid, pivalic acid, neohexanoic acid, octylic acid, 2-ethylhexanoic acid, neononanoic acid, neodecanoic acid, 1-adamantanecarboxylic acid, stearic acid and the like. Among these organic acids, octylic acid, 2-ethylhexanoic acid, neononanoic acid, and neodecanoic acid are preferable from the viewpoint of the stability and handleability of the compound.

Examples of the organic acid of the organic acid metal salt include those described above. Examples of the metal include aluminum, potassium, and bismuth. Examples of the organic acid metal salt include aluminum octoate, aluminum 2-ethylhexanoate, aluminum neononanoate, aluminum neodecanoate, potassium octoate, potassium 2-ethylhexanoate, potassium neononanoate, potassium neodecanoate, bismuth octoate, bismuth 2-ethylhexanoate, bismuth neononanoate, and bismuth neodecanoate.

The above-mentioned organic acids and organic acid metal salts may be used alone or in combination of two or more kinds.

(Moisture-Curable Composition)

The moisture-curable composition of the present invention contains the above-mentioned curing catalyst [B], the organic polymer [A1] or the organopolysiloxane [A2], and may further contain other additives as described below as necessary. The preparation of the moisture-curable composition of the present invention may be performed by mixing both under dry conditions, and the form of mixing is not particularly limited. Usually, the mixing may be carried out in an atmosphere at a temperature of about 15 to 30° C. and 60% RH or less.

In the moisture-curable composition of the present invention, a content of the curing catalyst [B] is preferably 0.1 to 20 parts by weight with respect to 100 parts by weight of the organic polymer [A1] or the organopolysiloxane [A2], more preferably 0.5 to 10 parts by weight, particularly preferably 4 to 8 parts by weight. If the content of the curing catalyst [B] is less than 0.1 part by weight, the curing performance may be insufficient, and if the content of the curing catalyst [B] exceeds 20 parts by weight, the cured product after curing may have poor recovery rate, physical properties such as weather resistance, and stability during storage.

The moisture-curable composition of the present invention may further contain a filler [C]. Examples of the filler include calcium carbonate, kaolin, talc, fumed silica, precipitated silica, silicic anhydride, hydrous silicic acid, clay, calcined clay, glass, bentonite, organic bentonite, shirasu balloon, glass fiber, asbestos, glass filament, crushed quartz, diatomaceous earth, aluminum silicate, aluminum hydroxide, zinc oxide, magnesium oxide, titanium dioxide and the like. The filler may be used alone or in combination of two or more kinds. By adding the filler, the handling of the moisture-curable composition is improved. The filler also acts as a rubber reinforcing agent for the cured product. The greatest advantage is that the amount of resin used can be reduced by adding the filler as an extender, so that the cost can be reduced.

Among the fillers described above, calcium carbonate and titanium dioxide are preferred from the viewpoint of maintaining excellent non-tack surface, 50% modulus, workability, weather resistance, and the like of the cured curable composition. When calcium carbonate is used, the proportion is preferably 1 to 200 parts by weight with respect to 100 parts by weight of the organic polymer [A1] or the organopolysiloxane [A2]. When it is in the above range, the properties after curing are not impaired.

The moisture-curable composition of the present invention may further contain additives usually added to the curable composition, such as a curing accelerator, a coloring agent, a plasticizer, a curing retarder, an anti-sagging agent, an anti-aging agent, and a solvent.

As the curing accelerator, for example, various known amino group-substituted alkoxysilane compounds or condensates thereof can be used. Specific examples of the curing accelerator include γ-aminopropyltrimethoxysilane, γ-aminopropyltriethoxysilane, N-(trimethoxysilylpropyl) ethylenediamine, δ-aminobutyl (methyl) diethoxysilane, N,N-bis (trimethoxysilylpropyl) ethylenediamine and partial hydrolysate thereof. These curing accelerators also have the effect of improving the adhesion to the substrate.

Specific examples of the coloring agent include iron oxide, carbon black, phthalocyanine blue, phthalocyanine green, and the like.

Specific examples of the plasticizer include phthalates such as dibutyl phthalate, dioctyl phthalate and butylbenzyl phthalate; aliphatic carboxylic acid esters such as dioctyl adipate, dioctyl succinate, diisodecyl succinate, butyl oleate; glycol esters such as pentaerythritol esters; phosphates such as trioctyl phosphate and tricresyl phosphate; epoxy plasticizers such as epoxidized soybean oil and benzyl epoxy stearate; chlorinated paraffins; and the like.

Specific examples of the anti-sagging agent include hydrogenated castor oil, silicic anhydride, organic bentonite, colloidal silica, and the like.

Further, as other additives, an adhesion imparting agent such as a phenol resin and an epoxy resin, an ultraviolet absorber, a radical chain inhibitor, a peroxide decomposer, various anti-aging agents and the like may be used.

The curable composition of the present invention is sufficiently stable at room temperature and thus has excellent storage properties, and the curing reaction proceeds spontaneously when it is brought into contact with moisture due to the blended curing catalyst [B]. In addition, the snap time (the time until the gel is semi-gelled and the fluidity disappeared) and the tack-free time (the time until the surface tack disappeared) are short and workability is excellent.

According to the above characteristics, the curable composition of the present invention can be used as a one-pack type sealing material. Specifically, it is suitably used for applications such as sealing materials, adhesives, sealants, waterproof fillers for buildings, ships, and vehicles such as automobiles.

EXAMPLES

Hereinafter, the present invention will be specifically described with reference to examples, but the scope of the present invention is not limited thereto.

Production Example 1

(Titanium Di (2-Ethylhexanoate) Diisopropoxide)

19.00 g (0.06685 mol) of tetraisopropoxytitanium and 19.28 g (0.1337 mol) of 2-ethylhexanoic acid are weighed into a 100 ml four-necked eggplant-shaped flask equipped with a nitrogen inlet tube, and thoroughly mixed with a stirrer. After stirring was continued until the internal temperature reached around 110° C., isopropyl alcohol was distilled off under reduced pressure to obtain 29.03 g (96%) of titanium di (2-ethylhexanoate) diisopropoxide as a yellow liquid. By FT-IR analysis of this compound, it was confirmed that the absorption of the carbonyl group of 2-ethylhexanoic acid (1700 cm$^{-1}$) shifted to the lower wavenumber side (1520 cm$^{-1}$).

Production Example 2

(Titanium Tri (2-Ethylhexanoate) Isopropoxide)

16.00 g (0.056294 mol) of tetraisopropoxytitanium and 24.35 g (0.16888 mol) of 2-ethylhexanoic acid are weighed into a 100 ml four-necked eggplant-shaped flask equipped with a nitrogen inlet tube, and thoroughly mixed with a stirrer. After stirring was continued until the internal temperature reached around 110° C., isopropyl alcohol was distilled off under reduced pressure to obtain 29.16 g (97%) of titanium tri (2-ethylhexanoate) isopropoxide as a yellow liquid. By FT-IR analysis of this compound, it was confirmed that the absorption of the carbonyl group of 2-ethylhexanoic acid (1700 cm$^{-1}$) shifted to the lower wavenumber side (1520 cm$^{-1}$).

Production Example 3

Titanium Dineodecanoate Diisopropoxide 250.00 g (0.8796 mol) of tetraisopropoxytitanium and 303.06 g (1.7592 mol) of neodecanoic acid were weighed into a 1000 ml four-necked eggplant-shaped flask equipped with a nitrogen inlet tube, and thoroughly mixed with a stirrer. After stirring was continued until the internal temperature reached around 110° C., isopropyl alcohol was distilled off under reduced pressure to obtain 439.27 g (98%) of titanium dineodecanoate diisopropoxide as a yellow liquid. By FT-IR analysis of this compound, it was confirmed that the absorption of the carbonyl group of neodecanoic acid (1690 cm$^{-1}$) shifted to the lower wavenumber side (1540 cm$^{-1}$).

Production Example 4

Titanium Trineodecanoate Isopropoxide 200.00 g (0.70368 mol) of tetraisopropoxytitanium and 363.66 g (2.111 mol) of neodecanoic acid were weighed into a 1000 ml four-necked eggplant-shaped flask equipped with a nitrogen inlet tube, and thoroughly mixed with a stirrer. After stirring was continued until the internal temperature reached around 110° C., isopropyl alcohol was distilled off under reduced pressure to obtain 429.93 g (98%) of titanium trineodecanoate isopropoxide as a yellow liquid. By FT-IR analysis of this compound, it was confirmed that the absorption of the carbonyl group of neodecanoic acid (1690 cm$^{-1}$) shifted to the lower wavenumber side (1550 cm$^{-1}$ and 1510 cm$^{-1}$).

Production Example 5

Titanium Dineodecanoate Di-n-Butoxide 40.00 g (0.11753 mol) of tetra-n-butoxytitanium and 40.49 g (0.23506 mol) of neodecanoic acid were weighed into a 300 ml four-necked eggplant-shaped flask equipped with a nitrogen inlet tube, and thoroughly mixed with a stirrer. After stirring was continued until the internal temperature reached around 110° C., n-butyl alcohol was distilled off under reduced pressure to obtain 59.92 g (95%) of titanium dineodecanoate di-n-butoxide as a yellow liquid. By FT-IR analysis of this compound, it was confirmed that the absorption of the carbonyl group of neodecanoic acid (1690 cm$^{-1}$) shifted to the lower wavenumber side (1540 cm$^{-1}$).

Production Example 6

Titanium Trineodecanoate n-Butoxide 40.00 g (0.11753 mol) of tetra-n-butoxytitanium and 60.74 g (0.35289 mol) of neodecanoic acid were weighed into a 300 ml four-necked eggplant-shaped flask equipped with a nitrogen inlet tube, and thoroughly mixed with a stirrer. After stirring was continued until the internal temperature reached around 110° C., n-butyl alcohol was distilled off under reduced pressure to obtain 71.82 g (96%) of titanium trineodecanoate n-butoxide as a yellow liquid. By FT-IR analysis of this compound, it was confirmed that the absorption of the carbonyl group of neodecanoic acid (1690 cm$^{-1}$) shifted to the lower wavenumber side (1550 cm$^{-1}$ and 1510 cm$^{-1}$).

Production Example 7

Aluminum Trineodecanoate 50.00 g (0.24480 mol) of triisopropoxyaluminum and 126.52 g (0.73440 mol) of neodecanoic acid were weighed into a 300 ml four-necked eggplant-shaped flask equipped with a nitrogen inlet tube, and thoroughly mixed with a stirrer. After stirring was continued until the internal temperature reached around 120° C., isopropyl alcohol was distilled off under reduced pressure to obtain 131.84 g (100%) of aluminum trineodecanoate as a yellow liquid. By FT-IR analysis of this compound, it was confirmed that the absorption of the carbonyl group of neodecanoic acid (1690 cm$^{-1}$) shifted to the lower wavenumber side (1584 cm$^{-1}$).

Production Example 8

Potassium Neodecanoate 10.00 g (0.1515 mol) of potassium hydroxide and 26.1 g (0.1515 mol) of neodecanoic acid were weighed into a 100 ml four-necked eggplant-shaped flask equipped with a nitrogen inlet tube, and thoroughly mixed with a stirrer. After stirring was continued at an internal temperature of 85° C. for 3 hours, water was distilled off under reduced pressure to obtain 27.29 g (86%) of potassium neodecanoate as a pale yellow solid. By FT-IR analysis of this compound, it was confirmed that the absorption of the carbonyl group of neodecanoic acid (1690 cm$^{-1}$) shifted to the lower wavenumber side (1550 cm$^{-1}$).

Production Example 9

Bismuth Trineodecanoate 45.00 g (0.09657 mol) of bismuth oxide and 99.82 g (0.57945 mol) of neodecanoic acid were weighed into a 300 ml four-necked eggplant-shaped flask equipped with a nitrogen inlet tube, and thoroughly mixed with a stirrer. After stirring was continued for 40 minutes at an internal temperature of 120° C., water was distilled off under reduced pressure to obtain 128.43 g (92%) of bismuth trineodecanoate as a pale yellow solid. By FT-IR analysis of this compound, it was confirmed that the absorption of the carbonyl group of neodecanoic acid (1690 cm$^{-1}$) shifted to the lower wavenumber side (1530 cm$^{-1}$).

Comparative Production Example 1

Titanium 2-Ethylhexanoate Triisopropoxide 24.00 g (0.084442 mol) of tetrapropoxytitanium and 12.18 g (0.084442 mol) of 2-ethylhexanoic acid are weighed into a 100 ml four-necked eggplant-shaped flask equipped with a nitrogen inlet tube, and thoroughly mixed with a stirrer. After stirring was continued until the internal temperature reached around 110° C., isopropyl alcohol was distilled off under reduced pressure to obtain 23.69 g (76%) of titanium 2-ethylhexanoate triisopropoxide as a yellow liquid. By FT-IR analysis of this compound, it was confirmed that the absorption of the carbonyl group of 2-ethylhexanoic acid (1700 cm$^{-1}$) shifted to the lower wavenumber side (1520 cm$^{-1}$).

(Preparation Of Moisture-Curable Composition)

The substances shown in Tables 1 to 6 were blended at the blending ratios shown in these tables and kneaded to prepare a moisture-curable composition. Further, the catalyst was diluted with a plasticizer, stored in an incubator at 50° C., and sampled at regular intervals to prepare a moisture-curable composition. The operations up to blending, kneading and curing were performed in an atmosphere of 25±1° C. and 50-60% RH.

<Measurement of Tack-free time (TFT)>

The tack-free time of the obtained moisture-curable composition was measured. The tack-free time is a time required from the end of kneading until the sample no longer adheres to the fingertip after lightly touching three places on the surface with a fingertip cleaned with ethyl alcohol.

<Adhesion Evaluation>

The moisture-curable compositions of Examples and Comparative Examples were applied to an iron plate, cured at room temperature for 3 days, and then peeled off by hand in the direction of 0°, and it was visually confirmed whether or not the cured product could be peeled off completely (×) or partially adhered and remained (○) at the adhesive interface.

Results of the measurement of the tack-free time and the evaluation of the adhesion are shown in Tables 1 to 6.

According to the comparison of Examples and Comparative Examples in Tables 1 to 6, it was found that when a combination catalyst of a titanium dicarboxylate dialkoxide or a titanium tricarboxylate alkoxide and a secondary or tertiary amine compound is used as in Examples, the tack-free time is short, and the adhesion of the cured product to the substrate is good.

When titanium monocarboxylate trialkoxide was used as the titanium compound as in Comparative Examples O1, O3, O5, O9, O13, S1, S3, S5, S9 and S13, the cured product was brittle and was broken before being peeled off.

When titanium tetracarboxylate was used as the titanium compound as in Comparative Examples O2, O4, O6, O10, O14, S2, S4, S6, S10, and S14, the adhesion was weak.

When a primary amine compound was used as the amine compound as in Comparative Examples O7 to O14 and S7 to S14, the adhesion was weak or the cured product was brittle.

TABLE 1

| | | | Example | | | | | | Comparative Example | | | | | | | | | | | | | |
|---|---|---|---|---|---|---|---|---|---|---|---|---|---|---|---|---|---|---|---|---|---|---|
| | | | O1 | O2 | O3 | O4 | O5 | O6 | O1 | O2 | O3 | O4 | O5 | O6 | O7 | O8 | O9 | O10 | O11 | O12 | O13 | O14 |
| Organic Polymer | | MS Polymer S-203 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Catalyst | Titanium Compound | Titanium Di(2-Ethylhexanoate) Diisopropoxide | 4.9 | 5.0 | 5.2 | 5.3 | 3.9 | 4.1 | | | | | | | | | | | | | | |
| | | Titanium Tri(2-Ethylhexanoate) Isopropoxide | | | | | | | 4.7 | | | | | | 4.3 | 4.5 | | | | | | |
| | | Titanium 2-Ethylhexanoate Triisopropoxide | | | | | | | | 5.2 | | | | 4.3 | | | 4.0 | 4.6 | 4.7 | | 4.4 | |
| | | Titanium Tetra-2-Ethylhexanoate | | | | | | | | | 5.0 | 5.4 | 3.6 | | | | | | | | 4.8 | | 5.0 |
| | Amine Compound | N,N-Dimethyl-propanediamine | 1.1 | | 0.8 | | | | 1.3 | 0.8 | | | | | | | | | | | | |
| | | Pyrrolidine | | 1.0 | | 0.7 | | | | | 1.0 | 0.6 | | | | | | | | | | |
| | | Dioctylamine | | | | | 1.1 | | | | | | 1.4 | 0.7 | | | | | | | | |
| | | Nissan Amine BB | | | | | | 0.9 | | | | | | | | | | | | | | |
| | | Octylamine | | | | | | | | | | | | | 1.7 | 1.5 | 2.0 | 1.4 | 1.3 | 1.2 | 1.6 | 1.0 |
| Filler | Calcium Carbonate | Calfine 200M | 136.0 | 136.0 | 136.0 | 136.0 | 136.0 | 136.0 | 136.0 | 136.0 | 136.0 | 136.0 | 136.0 | 136.0 | 136.0 | 136.0 | 136.0 | 136.0 | 136.0 | 136.0 | 136.0 | 136.0 |
| | | Super S | 52.8 | 52.8 | 52.8 | 52.8 | 52.8 | 52.8 | 52.8 | 52.8 | 52.8 | 52.8 | 52.8 | 52.8 | 52.8 | 52.8 | 52.8 | 52.8 | 52.8 | 52.8 | 52.8 | 52.8 |
| | Titanium Oxide | FR-41 | 26.0 | 26.0 | 26.0 | 26.0 | 26.0 | 26.0 | 26.0 | 26.0 | 26.0 | 26.0 | 26.0 | 26.0 | 26.0 | 26.0 | 26.0 | 26.0 | 26.0 | 26.0 | 26.0 | 26.0 |
| Other Additives | Plasticizer | DINP | 72.0 | 72.0 | 72.0 | 72.0 | 72.0 | 72.0 | 72.0 | 72.0 | 72.0 | 72.0 | 72.0 | 72.0 | 72.0 | 72.0 | 72.0 | 72.0 | 72.0 | 72.0 | 72.0 | 72.0 |
| | Anti-Sagging Agent | DISPARLON 6500 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 |
| | Ultraviolet Absorber | Songsorb 3260P | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| | Light Stabilizer | Sabostab UV-70 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| | Dehydrating Agent | KBE-1003 | 2.8 | 2.8 | 2.8 | 2.8 | 2.8 | 2.8 | 2.8 | 2.8 | 2.8 | 2.8 | 2.8 | 2.8 | 2.8 | 28 | 2.8 | 2.8 | 2.8 | 2.8 | 2.8 | 2.8 |
| | Adhesion Imparting Agent | KBM-603 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Tack-Free Time (hr) | | | 4.3 | 4.2 | 3.9 | 3.7 | 4.5 | 4.2 | >8 | 7.1 | >8 | 6.5 | >8 | 7.5 | 6.5 | 6.3 | >8 | >8 | 6.3 | 6.2 | >8 | >8 |
| Adhesion | | | ○ | ○ | ○ | ○ | ○ | ○ | U.M. | × | U.M. | × | U.M. | × | × | × | U.M. | × | × | × | U.M. | × |

U.M. denotes "Unmeasurable"

TABLE 2

| | | | Example | | | | | | | | | | | | | |
|---|---|---|---|---|---|---|---|---|---|---|---|---|---|---|---|---|
| | | | O7 | O8 | O9 | O10 | O11 | O12 | O13 | O14 | O15 | O16 | O17 | O18 | O19 | O20 |
| Organic Polymer | | MS Polymer S-203 | 100.0 | 100.0 | 100.0 | 100.0 | 100.0 | 100.0 | 100.0 | 100.0 | 100.0 | 100.0 | 100.0 | 100.0 | 100.0 | 100.0 |
| Catalyst | Titanium Compound | Titanium Dineodecanoate Diisopropoxide | 5.0 | | | | | | | | | | | | | |
| | | Titanium Trineodecanoate Isopropoxide | | 5.2 | | | 5.0 | 4.6 | 5.4 | 5.3 | 5.2 | 52 | 5.2 | 52 | 4.8 | 5.1 |
| | | Titanium Dineodecanoate Di-n-Butoxide | | | 5.0 | | | | | | | | | | | |
| | | Titanium Trineodecanoate n-Butoxide | | | | 5.2 | | | | | | | | | | |
| | Amine Compound | N,N-Dimethyl-propanediamine | 1.0 | 0.8 | 1.0 | 0.8 | | | | | | | | | | |
| | | N,N-Diethyl-propanediamine | | | | | 1.0 | | | | | | | | | |
| | | N,N-Dibutyl-propanediamine | | | | | | 1.4 | | | | | | | | |
| | | Pyrrolidine | | | | | | | 0.6 | | | | | | | |
| | | Piperidine | | | | | | | | 0.7 | | | | | | |
| | | 2-Methylpiperidine | | | | | | | | | 0.8 | | | | | |
| | | 4-Methylpiperidine | | | | | | | | | | 0.8 | | | | |
| | | Hexamethyleneimine | | | | | | | | | | | 0.8 | | | |
| | | N-Methylpiperazine | | | | | | | | | | | | 0.8 | | |
| | | DBU | | | | | | | | | | | | | 1.2 | |
| | | 1,1,3,3-Tetramethyl-guanidine | | | | | | | | | | | | | | 0.9 |
| Filler | Calcium Carbonate | Calfine 200M | 136.0 | 136.0 | 136.0 | 136.0 | 136.0 | 136.0 | 136.0 | 136.0 | 136.0 | 136.0 | 136.0 | 136.0 | 136.0 | 136.0 |
| | | Super S | 52.8 | 52.8 | 52.8 | 52.8 | 52.8 | 52.8 | 52.8 | 52.8 | 52.8 | 52.8 | 52.8 | 52.8 | 52.8 | 52.8 |
| | Titanium Oxide | FR-41 | 26.0 | 26.0 | 26.0 | 26.0 | 26.0 | 26.0 | 26.0 | 26.0 | 26.0 | 26.0 | 26.0 | 26.0 | 26.0 | 26.0 |
| Other Additives | Plasticizer | DINP | 72.0 | 72.0 | 72.0 | 72.0 | 72.0 | 72.0 | 72.0 | 72.0 | 72.0 | 72.0 | 72.0 | 72.0 | 72.0 | 72.0 |
| | Anti-Sagging Agent | DISPARLON 6500 | 2.8 | 2.8 | 2.8 | 2.8 | 2.8 | 2.8 | 2.8 | 2.8 | 2.8 | 2.8 | 2.8 | 2.8 | 2.8 | 2.8 |
| | Ultraviolet Absorber | Songsorb 3260P | 1.2 | 1.2 | 1.2 | 1.2 | 1.2 | 1.2 | 1.2 | 1.2 | 1.2 | 1.2 | 1.2 | 1.2 | 1.2 | 1.2 |
| | Light Stabilizer | Sabostab UV-70 | 1.2 | 1.2 | 1.2 | 1.2 | 1.2 | 1.2 | 1.2 | 1.2 | 1.2 | 1.2 | 1.2 | 1.2 | 1.2 | 1.2 |
| | Dehydrating Agent | KBE-1003 | 2.8 | 2.8 | 2.8 | 2.8 | 23 | 2.8 | 2.8 | 2.8 | 2.8 | 2.8 | 2.8 | 2.8 | 2.8 | 2.8 |
| | Adhesion Imparting Agent | KBM-603 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Tack-Free Time (hr) | | 1.7 | 1.6 | 1.8 | 1.7 | 1.2 | 1.8 | 1.1 | 1.1 | 1.1 | 0.9 | 0.9 | 2.3 | 2.9 | 2.0 |
| | Adhesion | | ○ | ○ | ○ | ○ | ○ | ○ | ○ | ○ | ○ | ○ | ○ | ○ | ○ | ○ |

TABLE 3

| | | | Example | | | | | | | |
|---|---|---|---|---|---|---|---|---|---|---|
| | | | O21 | O22 | O23 | O24 | O25 | O26 | O27 | O28 |
| Organic Polymer | | MS Polymer S-203 | 100.0 | 100.0 | 100.0 | 100.0 | 100.0 | 100.0 | 100.0 | 100.0 |
| Catalyst | Titanium Compound | Titanium Dineodecanoate Diisopropoxide | 3.9 | | | | | | | |
| | | Titanium Trineodecanoate Isopropoxide | | 4.2 | | 4.0 | 4.2 | 2.6 | 2.3 | 3.4 | 2.0 |
| | Amine Compound | N,N-Dimethylpropenediamine | 0.7 | 0.8 | | | 0.4 | 0.4 | 0.6 | 0.3 |
| | | N,N-Diethylpropanediamine | | | 0.8 | | | | | |
| | | 4-Methylpiperidine | | | | 0.7 | | | | |
| | Other | Aluminum Trineodecanoate | | | | | 2.3 | | | |
| | | Bismuth Trineodecanoate | | | | | | | 2.7 | 2.4 |
| | | Potassium Neodecanoate | | | | | | | 1.1 | 0.7 |
| | | Neodecanoic Acid | 12 | 1.3 | 1.1 | 1.2 | 0.7 | 0.6 | 0.9 | 0.6 |
| Filler | Calcium Carbonate | Calfine 200M | 136.0 | 136.0 | 136.0 | 136.0 | 136.0 | 136.0 | 136.0 | 136.0 |
| | | Super S | 52.8 | 52.8 | 52.8 | 52.8 | 52.8 | 52.8 | 52.8 | 52.8 |
| | Titanium Oxide | FR-41 | 26.0 | 26.0 | 26.0 | 26.0 | 26.0 | 26.0 | 26.0 | 26.0 |
| Other Additives | Plasticizer | DINP | 72.0 | 72.0 | 72.0 | 72.0 | 72.0 | 72.0 | 72.0 | 72.0 |
| | Anti-Sagging Agent | DISPARLON 6500 | 2.6 | 2.8 | 2.8 | 2.8 | 2.8 | 2.8 | 2.8 | 2.8 |
| | Ultraviolet Absorber | Songsorb 3260P | 1.2 | 1.2 | 1.2 | 1.2 | 1.2 | 1.2 | 1.2 | 1.2 |

TABLE 3-continued

|  |  | Example | | | | | | | |
| --- | --- | --- | --- | --- | --- | --- | --- | --- | --- |
|  |  | O21 | O22 | O23 | O24 | O25 | O26 | O27 | O28 |
| Light Stabilizer | Sabostab UV-70 | 1.2 | 1.2 | 1.2 | 1.2 | 1.2 | 1.2 | 1.2 | 1.2 |
| Dehydrating Agent | KBE-1003 | 2.8 | 2.8 | 2.8 | 2.8 | 2.8 | 2.8 | 2.8 | 2.8 |
| Adhesion Imparting Agent | KBM-603 | 4.0 | 4.0 | 4.0 | 4.0 | 4.0 | 4.0 | 4.0 | 4.0 |
| Tack-FreeTime (hr) |  | 1.2 | 1.2 | 1.0 | 0.8 | 1.1 | 1.3 | 1.2 | 1.1 |
| Adhesion |  | ○ | ○ | ○ | ○ | ○ | ○ | ○ | ○ |

TABLE 4

| | | Example | | | | | | | Comparative Example | | | | | | | | |
|---|---|---|---|---|---|---|---|---|---|---|---|---|---|---|---|---|---|
| | | S1 | S2 | S3 | S4 | S5 | S6 | S1 | S2 | S3 | S4 | S5 | S6 | S7 | S8 | S9 | S10 | S11 | S12 | S13 | S14 |
| Organopolysiloxane | KE-66 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 1100.0 | 100.0 | 100.0 | 100.0 |
| Catalyst | Titanium Di (2-Ethylhexanoate) Diisopropoxide | 4.9 | 5.0 | 5.2 | 5.3 | 3.9 | | | | | | | | 4.3 | 4.5 | | | 4.7 | 4.8 | | |
| | Titanium Tri (2-Ethylhexanoate Isopropoxide | | | | | | 4.1 | | | | | | | | | | | | | | |
| | Titanium 2-Ethylhexenoate Triisopropoxide | | | | | | | 4.7 | | | | 3.6 | | | | 4.0 | | | | | |
| | Titanium Tetra-2-Ethylhexanoate | | | | | | | | 5.2 | 5.0 | 5.4 | | 4.3 | | | | 4.6 | | | 4.4 | 5.0 |
| Amine Compound | N,N-Dimethyl propanediamine | 1.1 | | 0.8 | | | | 1.3 | 0.8 | | | | | | | | | | | | |
| | Pyrrolidine | | 1.0 | | 0.7 | 1.1 | | | | 1.0 | 0.6 | 1.4 | 0.7 | 1.7 | 1.5 | 2.0 | 1.4 | 1.3 | 1.2 | 1.6 | 1.0 |
| | Dioctylamine | | | | | | 0.9 | | | | | | | | | | | | | | |
| | Nissan Amino BB Octylamine | | | | | | | | | | | | | | | | | | | | |
| Filler | Calcium Carbonate Calfine 200M | 120.0 | 120.0 | 120.0 | 120.0 | 120.0 | 120.0 | 120.0 | 120.0 | 120.0 | 120.0 | 120.0 | 120.0 | 120.0 | 120.0 | 120.0 | 120.0 | 120.0 | 120.0 | 120.0 | 120.0 |
| | Titanium Oxide FR-41 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Other Additives | Anti-Sagging Agent Hydrogenated Castor Oil | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Anti-Aging Agent Nocrac NS-6 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 |
| | Liquid Paraffin Sumoil P-350 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | Adhesion Imparting Agent KBM-603 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Tack-Free Time (hr) | | 2.9 | 2.8 | 2.6 | 2.5 | 3 | 2.8 | >8 | 4.7 | >8 | 4.4 | >8 | 5.1 | 4.3 | 4.21 | >8 | >8 | 4.2 | 4.1 | >8 | >8 |
| Adhesion | | ○ | ○ | ○ | ○ | ○ | ○ | U.M. | x | U.M. | x | U.M. | x | x | x | U.M. | x | x | x | U.M. | x |

U.M. denotes "Unmeasurable"

TABLE 5

| | | Example | | | | | | | | | | | | | |
|---|---|---|---|---|---|---|---|---|---|---|---|---|---|---|
| | | S7 | S8 | S9 | S10 | S11 | S12 | S13 | S14 | S15 | S16 | S17 | S18 | S19 | S20 |
| Organopolysiloxane | KE-66 | 100.0 | 100.0 | 100.0 | 100.0 | 100.0 | 100.0 | 100.0 | 100.0 | 100.0 | 100.0 | 100.0 | 100.0 | 100.0 | 100.0 |
| Catalyst Titanium Compound | Titanium Dineodecanoate Diisopropoxide | 5.0 | | | | | | | | | | | | | |
| | Titanium Trineodecanoate Isopropoxide | | 5.2 | | | 5.0 | 4.6 | 5.4 | 5.3 | 5.2 | 5.2 | 5.2 | 5.2 | 4.8 | 5.1 |
| | Titanium Dineodecanoate Di-n-Butoxide | | | 5.0 | | | | | | | | | | | |
| | Titanium Trineodecanoate n-Butoxide | | | | 5.2 | | | | | | | | | | |
| Amine Compound | N,N-Dimethyl propanediamine | 1.0 | 0.8 | 1.0 | 0.8 | | | | | | | | | | |
| | N,N-Diethyl propanediamine | | | | | 1.0 | | | | | | | | | |
| | N,N-Dibutyl propanediamine | | | | | | 1.4 | | | | | | | | |
| | Pyrrolidine | | | | | | | 0.6 | | | | | | | |
| | Piperidine | | | | | | | | 0.7 | | | | | | |
| | 2-Methylpiperidine | | | | | | | | | 0.8 | | | | | |
| | 4-Methylpiperidine | | | | | | | | | | 0.8 | | | | |
| | Hexamethyleneimine | | | | | | | | | | | 0.8 | | | |
| | N-Methylpiperazine | | | | | | | | | | | | 0.8 | | |
| | DBU | | | | | | | | | | | | | 1.2 | |
| | 1,1,3,3-Tetramethyl guanidine | | | | | | | | | | | | | | 0.9 |
| Filler Calcium Carbonate | Calfine 200M | 120.0 | 120.0 | 120.0 | 120.0 | 120.0 | 120.0 | 120.0 | 120.0 | 120.0 | 120.0 | 120.0 | 120.0 | 120.0 | 120.0 |
| Titanium Oxide | FR-41 | 20.0 | 20.0 | 20.0 | 20.0 | 20.0 | 20.0 | 20.0 | 20.0 | 20.0 | 20.0 | 20.0 | 20.0 | 20.0 | 20.0 |
| Other Additives Anti-Sagging Agent | Hydrogenated Castor Oil | 4.0 | 4.0 | 4.0 | 4.0 | 4.0 | 4.0 | 4.0 | 4.0 | 4.0 | 4.0 | 4.0 | 4.0 | 4.0 | 4.0 |
| Anti-Aging Agent | Nocrac NS-6 | 0.5 | 0.5 | 0.5 | 0.5 | 0.5 | 0.5 | 0.5 | 0.5 | 0.5 | 0.5 | 0.5 | 0.5 | 0.5 | 0.5 |
| Liquid Paraffin | Sumoil P-350 | 2.0 | 2.0 | 2.0 | 2.0 | 2.0 | 2.0 | 2.0 | 2.0 | 2.0 | 2.0 | 2.0 | 2.0 | 2.0 | 2.0 |
| Adhesion Imparting Agent | KBM-603 | 0.5 | 0.5 | 0.5 | 0.5 | 0.5 | 0.5 | 0.5 | 0.5 | 0.5 | 0.5 | 0.5 | 0.5 | 0.5 | 0.5 |
| Tack-Free Time (hr) | | 1.1 | 1.1 | 1.2 | 1.2 | 0.8 | 1.2 | 0.7 | 0.7 | 0.7 | 0.6 | 0.6 | 1.5 | 1.9 | 1.3 |
| Adhesion | | ○ | ○ | ○ | ○ | ○ | ○ | ○ | ○ | ○ | ○ | ○ | ○ | ○ | ○ |

TABLE 6

| | | Example | | | | | | | |
|---|---|---|---|---|---|---|---|---|---|
| | | S21 | S22 | S23 | S24 | S25 | S26 | S27 | S28 |
| Organopolysiloxane | KE-66 | 100.0 | 100.0 | 100.0 | 100.0 | 100.0 | 100.0 | 100.0 | 100.0 |
| Catalyst Titanium Compound | Titanium Dineodecanoate Diisopropoxide | | 3.9 | | | | | | |
| | Titanium Trineodecanoate Isopropoxide | 4.2 | | 4.0 | 4.2 | 2.6 | 2.3 | 3.4 | 2.0 |
| Amine Compound | N,N-Dimethyl propanediamine | 0.7 | 0.8 | | | 0.4 | 0.4 | 0.6 | 0.3 |
| | N,N-Diethyl propanediamine | | | 0.8 | | | | | |
| | 4-Methyl piperidine | | | | 0.7 | | | | |
| Other | Aluminum Trineodecanoate | | | | | 2.3 | | | |
| | Bismuth Trineodecanoate | | | | | | 2.7 | | 24 |
| | Potassium Neodecanoate | | | | | | | 1.1 | 0.7 |
| | Neodecanoic Acid | 1.2 | 1.3 | 1.1 | 1.2 | 0.7 | 0.6 | 0.9 | 0.6 |
| Filler Calcium Carbonate | Calfine 200M | 120.0 | 120.0 | 120.0 | 120.0 | 120.0 | 120.0 | 120.0 | 120.0 |

TABLE 6-continued

|  |  |  | Example | | | | | | | |
|---|---|---|---|---|---|---|---|---|---|---|
|  |  |  | S21 | S22 | S23 | S24 | S25 | S26 | S27 | S28 |
| Other Additives | Titanium Oxide | FR-41 | 20.0 | 20.0 | 20.0 | 20.0 | 20.0 | 20.0 | 20.0 | 20.0 |
|  | Anti-Sagging Agent | Hydrogenated Castor Oil | 4.0 | 4.0 | 4.0 | 4.0 | 4.0 | 4.0 | 4.0 | 4.0 |
|  | Anti-Aging Agent | Nocrac NS-6 | 0.5 | 0.5 | 0.5 | 0.5 | 0.5 | 0.5 | 0.5 | 0.5 |
|  | Liquid Paraffin | Sumoil P-350 | 2.0 | 2.0 | 2.0 | 2.0 | 2.0 | 2.0 | 2.0 | 2.0 |
|  | Adhesion Imparting Agent | KBM-603 | 0.5 | 0.5 | 0.5 | 0.5 | 0.5 | 0.5 | 0.5 | 0.5 |
|  | Tack-Free Time (hr) |  | 0.8 | 0.8 | 0.7 | 0.5 | 0.7 | 0.9 | 0.8 | 0.7 |
|  | Adhesion |  | ○ | ○ | ○ | ○ | ○ | ○ | ○ | ○ |

The amounts of the materials shown in Tables 1 to 6 are parts by mass. The details of the materials shown in Tables 1 to 6 are as follows.
(Organic Polymer)
MS Polymer S203: silyl group-containing organic polymer (Kaneka Co., Ltd.)
(Organopolysiloxane)
KE-66: organopolysiloxane (Shin-Etsu Chemical Co., Ltd.)
(Titanium Compound)
Titanium Tetra (2-Ethylhexanoate): available from Alfa Aesar
(Primary Amine Compound)
Nissan Amine BB(registered trademark)BB: laurylamine (NOF Co., Ltd.) Octylamine: available from Wako Pure Chemical Industries, Ltd.
(Secondary or Tertiary Amine Compound)
Pyrrolidine: available from Tokyo Chemical Industry Co., Ltd.
Piperidine: available from Tokyo Chemical Industry Co., Ltd.
2-Methylpiperidine: available from Tokyo Chemical Industry Co., Ltd.
4-Methylpiperidine: available from Tokyo Chemical Industry Co., Ltd.
Hexamethyleneimine: available from Tokyo Chemical Industry Co., Ltd.
N-methylpiperazine: available from Tokyo Chemical Industry Co., Ltd.
N,N-Dimethylpropanediamine: available from Tokyo Chemical Industry Co., Ltd.
N,N-Diethylpropanediamine: available from Tokyo Chemical Industry Co., Ltd.
N,N-Dibutylpropanediamine: available from Tokyo Chemical Industry Co., Ltd.
DBU (Diazabicycloundecene): available from Tokyo Chemical Industry Co., Ltd.
1,1,3,3-Tetramethylguanidine: available from Tokyo Chemical Industry Co., Ltd.
(Catalyst and Others)
Versatic 10(registered trademark):neodecanoic acid (Hexion)
(Filler)
Calfine 200M, Super S: calcium carbonate (Maruo Calcium Co., Ltd.)
FR-41: titanium oxide(Furukawa Chemicals Co., Ltd.)
(Other Additives)
DINP: Plasticizer (J-PLUS Co., Ltd.)
DISPARLON 6500: anti-sagging agent (Kusumoto Chemicals Co., Ltd.)
Songsorb 3260P: ultraviolet absorber (SONGWON)
Sabostab UV-70: light stabilizer (SONGWON)
KBE-1003:dehydrating agent (Shin-Etsu Silicone Industry Co., Ltd.)
KBM-603: adhesion imparting agent (Shin-Etsu Silicone Industry Co., Ltd.)
Versatic 10 (registered trademark): neodecanoic acid(Hexion)
Hydrogenated Castor Oil: anti-sagging agent (ITOH OIL CHEMICALS CO.,LTD.)
Nocrac NS-6: anti-aging agent (Ouchi Shinko Chemical Industry Co., Ltd.)
Sumoil P-350: liquid paraffin (Muramatsu Oil Co., Ltd.)

The invention claimed is:
1. A curing catalyst [B] for an organic polymer or an organopolysiloxane, which is used for curing an organic polymer [A1] or an organopolysiloxane [A2] having a reactive hydrolyzable silicon-containing group, wherein
the catalyst [B] contains a titanium compound [B1] represented by the following formula and a secondary amine compound or a tertiary amine compound [B2],

$$(R^1-O)_n\text{Ti-A}_{4-n}$$

wherein $R^1$ is a hydrocarbon group having 1 to 10 carbon atoms, and A is a carboxylic acid residue, and n is 1 or 2.
2. A moisture-curable composition, comprising the catalyst [B] and the organic polymer [A1] or the organopolysiloxane [A2] of claim 1.
3. The moisture-curable composition of claim 2, further comprising an organic acid.
4. The moisture-curable composition of claim 3, wherein the organic acid is at least one selected from octylic acid, 2-ethylhexanoic acid, neononanoic acid, and neodecanoic acid.
5. The moisture-curable composition of claim 2, further comprising an organic acid metal salt.
6. The moisture-curable composition of claim 5, wherein the organic acid metal salt is at least one selected from aluminum octoate, aluminum 2-ethylhexanoate, aluminum neononanoate, aluminum neodecanoate, potassium octoate, potassium 2-ethylhexanoate, potassium neononanoate, potassium neodecanoate, bismuth octoate, bismuth 2-ethylhexanoate, bismuth neononanoate, and bismuth neodecanoate.
7. A method for producing a cured product, comprising contacting the moisture-curable composition of claim 2 with moisture.

* * * * *